United States Patent Office 3,364,217
Patented Jan. 16, 1968

3,364,217
HYDRAZIDES OF HALO SUBSTITUTED POLYHYDROALKANONAPHTHALENEDICARBOXYLIC ACIDS
Henryk A. Cyba, Evanston, Ill., assignor to Universal Oil Products Company, Des Plaines, Ill., a corporation of Delaware
No Drawing. Filed Dec. 28, 1964, Ser. No. 421,711
7 Claims. (Cl. 260—250)

ABSTRACT OF THE DISCLOSURE

Halosubstituted polyhydroalkanonaphthalenedicarboxyhydrazide and derivatives thereof, exemplified by 5,6,7,8,9,9 - hexachloro - 1,2,3,4,4a,5,8,8a - octahydro - 5,8-methano - 2,3 - naphthalenedicarboxy-$N^1$-methyl-$N^1,N^2$-hydrazide, useful as insecticides, flame retardants for epoxy resins and textile finishing agents.

---

This invention relates to novel compositions of matter and to a method for the preparation thereof. More particularly the invention is concerned with hydrazides of polychloro and polybromo substituted octahydromethano-2,3-napthalenedicarboxylic acids and to a process for preparing these compounds.

Certain novel compositions of matter which comprise hydrazides of halo substituted polyhydroalkanonaphthalenedicarboxylic acids and which are prepared according to the process hereinafter set forth in greater detail will find a wide variety of uses in the chemical field. For example, these novel compounds, due to the specific configuration of the molecule, may be useful as pestiologically active compounds being useful as insecticides, ovicides for flies, red spiders, aphids, scale-insects, mites, etc., as fungicides, herbicides; as defoliants, especially for cotton; as wood, leather, and paper preservatives, etc. In addition, the compounds of the present invention which, as hereinbefore set forth, are designated generically as hydrazides of halo substituted polyhydroalkanonaphthalenedicarboxylic acids are particularly useful as additives to certain polymeric compositions of matter such as plastics, polymers, resins, paints, waxes, varnishes, fibers, latexes, rubber, etc., whereby the finished product will contain certain advantageous physical properties such as flame-proofing, fire-retardancy, color-stability, etc. A particular type of polymeric product with which the additive of the present invention may be admixed are resins which are referred to as epoxy resins, the compounds of the present invention acting as curing acids therefore, and concomitantly imparting useful properties to the cured resins. As hereinbefore set forth, one of these useful properties is fire-resistance or flame-retardance, the resin being self-extinguishing when removed from the direct action of a flame. This property of being resistant to fire will be especially useful when preparing articles of commerce which will be used in places which may be subject to excessive heat or the action of a flame.

In addition, it is also contemplated that the hydrazides of the halo substituted polyhydroalkanonaphthalenedicarboxylic acids will be useful as a grease additive acting as an extreme pressure additive, or as a textile finishing agent, the hydrazide being used as one of the materials in an interfacial polymerization process which is useful in imparting shrink-proofing properties to fibrous materials and particularly to wool. The interfacial polymerization process is effected by treating the fibrous material with a hydrazide of a polyhalopolyhydromethanonaphthalenedicarboxylic acid and thereafter further treating the fibrous material with a polyacid polyhalide containing at least two acid halide groups per molecule, both the hydrazide and polyacid polyhalide being in solutions which are mutually immiscible with one another. The formation of the polymer on the fibrous material and particularly wool will impart a shrink-proofing property to the material as well as many other desirable physical characteristics including smoothness after drying, excellent hand, increased break strength and tear strength as well as improved resistance to abrasion, chemicals and pilling. The use of the hydrazides in the present invention as one of the reactants in forming the polymer is advantageous inasmuch as the fibrous material, and particularly wool, after treatment thereof will not have the desirable characteristics of the fibrous material altered nor will a post-cure of the material be necessary.

It is therefore an object of this invention to provide novel compositions of matter which are useful compounds and to a method of the preparation therefor.

A further object of this invention is to provide novel compositions of matter comprising hydrazides of halo substituted polyhydroalkanonaphthalenedicarboxylic acids which impart useful properties when admixed with other chemical compositions of matter.

Yet another object of this invention is to provide a process for preparing hydrazides of halo substituted polyhydroalkanonaphthalenedicarboxylic acids.

In a broad aspect one embodiment of this invention is found in a hydrazide of a halo substituted polyhydroalkanonaphthalenedicarboxylic acid.

A further embodiment of this invention resides in a process for the preparation of a hydrazide of a halo substituted polyhydroalkanonaphthalenedicarboxylic acid which comprises reacting a hydrazine with a compound selected from the group consisting of halo substituted polyhydroalkanonaphthalenedicarboxylic acids and anhydrides thereof at a temperature in the range of from about 20° to about 150° C., removing water formed during the reaction, and recovering the resultant halo substituted polyhydroalkanonaphthalenedicarboxy hydrazide.

A specific embodiment of this invention is found in 5,6,7,8,9,9 - hexachloro - 1,2,3,4,4a,5,8,8a - octahydro-5,8-methano-2,3 - naphthalenedicarboxy - $N^1$ - phenyl-$N^1,N^2$-hydrazide.

Yet another specific embodiment of this invention is found in a process for the preparation of a hydrazide of a halo substituted polyhydromethanonaphthalenedicarboxylic acid which comprises reacting hydrazide hydrate with 5,6,7,8,9,9 - hexachloro-1,2,3,4,4a,5,8,8a-octahydro-5,8-methano-2,3-naphthalenedicarboxylic acid in the presence of methanol at a temperature in the range of from 50° to about 75° C., thereafter adding toluene to the resultant solution, azeotroping off water at a temperature in the range of from about 110° to about 120° C. and recovering the resultant 5,6,7,8,9,9-hexachloro-1,2,3,4,4a,5,8,8a-octahydro-5,8-methano-2,3 - naphthalenedicarboxy-$N^1,N^2$-hydrazide.

Other objects and embodiments will be found in the following further detailed description of this invention.

As hereinbefore set forth the present invention is concerned with novel compositions of matter and for a process for preparing the same. The process involves reacting a compound selected from the group consisting of halo substituted polyhydroalkanonaphthalenedicarboxylic acids and anhydrides thereof with a hydrazine at reaction conditions and, if so desired, in the presence of a substantially inert organic solvent to prepared hydrazides of halo substituted polyhydroalkanonaphthalenedicarboxylic acids.

The halo substituted polyhydroalkanonaphthalenedicarboxylic acids or anhydrides thereof which comprises one of the starting materials utilized in the process of this invention may be prepared in any suitable manner, the preferred manner being the Diels-Alder reaction of a conjugated aliphatic diene with an olefinic dicarboxylic acid or anhydride. Examples of conjugated aliphatic dienes which may be used include 1,3-butadiene, 2-methyl-1,3-butadene, 1,3-pentadiene, etc. Olefinic dicarboxylic acids which may be used include maleic acid, maleic anhydride, fumaric acid, itaconic acid, citraconic acid, vinylmalonic acid, etc. The Diels-Alder condensation between the aforementioned conjugated aliphatic dienes and unsaturated or olefinic dicarboxylic acids or anhydrides will take place at an elevated temperature in the range of from about 80° to about 250° C. or more, the preferred range being from about 100° to about 200° C. and usually at a pressure sufficient to maintain a major potrion of the reactants in a liquid phase, said pressure being in the range of from about atmospheric to about 100 atmospheres or more.

The resulting compound which may be generically referred to as a tetrahydrophthalic acid or anhydride which results from the aforementioned condensation is then further condensed with a conjugated halocycloalkadiene to form the desired product. Examples of the halo substituted halocycloalkadienes which may be used include 1-chlorocyclopentadiene, 1,5-dichlorocyclopentadiene, 1,2,3,4-tetrachlorocyclopentadiene, hexachlorocyclopentadiene, 1-bromocyclopentadiene, 1,5-dibromocyclopentadiene, 1,2,3,4-tetrabromocyclopentadiene, hexabromocyclopentadiene, etc. The second condensation reaction is also effected in the Diels-Alder manner at elevated temperatures in the range of from about 50° to about 250° C., the preferred range being from about 100° to about 200° C. In addition, a pressure in an amount sufficient to maintain a major portion of the reactants in a liquid phase is used, said pressure ranging from atmospheric up to about 100 atmospheres or more. Examples of halo substituted polyhydroalkanonaphthalenedicarboxylic acids or anhydrides which are utilized as starting materials in the process of the present invention to prepare novel compositions of matter include 5,6,7,8-tetrachloro-1,2,3,4,4a,5,8,8a-octahydro-5,8-methano-2,3-naphthalenedicarboxylic acid, 5,6,7,8-tetrachloro-1,2,3,4,4a,5,8,8a-octahydro-5,8-methano-2,3-naphthalenedicarboxylic anhydride, 5,6,7,8-tetrabromo-1,2,3,4,4a,5,8,8a-octahydro-5,8-methano-2,3-naphthalenedicarboxylic acid, 5,6,7,8,9,9-hexachloro-1,2,3,4,4a,5,8,8a-octahydro-5,8-methano-2,3-naphthalenedicarboxylic acid, 5,6,7,8,9,9 - hexachloro - 1,2,3,4,4a,5,8,8a - octahydro-5,8-methano-2,3-naphthalenedicarboxylic anhydride, 5,6,7,8,9,9 - hexabromo - 1,2,3,4,4a,5,8,8a - octahydro - 5,8-methano-2,3-naphthalenedicarboxylic acid, etc. While the examples of halo substituted polyhydroalkanonaphthalenedicarboxylic acids hereinbefore set forth contain at least 4 halogen substituents, it is to be understood that the term "halo substituted polyhydroalkanonaphthalenedicarboxylic acid or anhydride" as utilized in the present specification and appended claims will refer to acids or anhydrides which may contain a lesser or greater number of halogen substituents, said number ranging from 1 up to 8.

Examples of hydrazines which may be used as one of the starting materials in the process of this invention possess the generic formula:

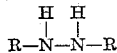

in which R may be selected from the group consisting of hydrogen, alkyl, cycloalkyl, aryl, alkaryl, and aralkyl radicals. Examples of these compounds include hydrazine, alkyl substituted hydrazines such as methylhydrazine, ethylhydrazine, propylhydrazine, isopropylhydrazine, N,$^1$N$^2$-dimethylhydrazine, N$^1$,N$^2$-diethylhydrazine, N$^1$,N$^2$-dipropylhydrazine, etc.; cycloalkyl substituted hydrazines such as cyclopentylhydrazine, cyclohexylhydrazine, cycloheptylhydrazine, etc.; aryl substituted hydrazines such as phenylhydrazine, naphthylhydrazine, etc.; alkylaryl substituted hydrazines such as o-tolylhydrazine, m-tolylhydrazine, p-tolylhydrazine, p-ethylphenylhydrazine, etc.; aralkyl substituted hydrazines such as benzylhydrazine, N$^1$,N$^2$-di-benzylhydrazine, etc. It is also contemplated that hydrazine hydrate may also be used as a starting material in this process.

It is to be understood that the aforementioned hydrazine and substituted hydrazines as well as the halo substituted polyhydroalkanonaphthalenedicarboxylic acids or anhydrides are only representative of the class of compounds which may be used and that the present invention is not necessarily limited thereto.

The reaction between the halo substituted polyhydroalkanonaphthalenedicarboxylic acid or anhydride and the particular hydrazine is effected at temperatures ranging from about 20° up to about 150° C. or more, the particular reaction temperature being dependent upon the nature of the substantially inert organic solvent which is added to the reaction. Examples of substantially inert organic solvents which may be utilized include aromatic hydrocarbons such as benzene, toluene, o-xylene, m-xylene, p-xylene, ethylbenzene, etc.

The process for the present invention which is utilized to prepare novel compositions of matter comprising hydrazines of halo substituted polyhydroalkanonaphthalenedicarboxylic acids may be effected in any suitable manner and may comprise either a batch or continuous type operation. When a batch type operation is used, a hydrazine of the type hereinbefore set forth in greater detail, along with a halo substituted polyhydroalkanonaphthalenedicarboxylic acid or anhydride is placed in an appropriate reaction vessel. The addition of the halo substituted polyhydroalkanonaphthalenedicarboxylic acid to the hydrazine is usually done in a gradual manner inasmuch as the reaction quite often is exothermic in nature. To control this exothermicity the hydrazine may be cooled prior to the addition of the acid and the resulting rise in temperature controlled by utilization of external cooling means such as, for example, an ice-bath. Upon completion of the addition of the acid, the reaction mixture is heated to a temperature of about 100° to about 110° C. After a pre-determined residence time, a substantially inert organic solvent of the type hereinbefore set forth may be added, and the water which has formed during the reaction is then azeotroped off, the reaction vessel having been equipped with means such as a water trap for removing this water. Upon completion of the azeotroping step which is evidenced by the removal and recovery of the theoretical amount of water, the reaction mixture is allowed to cool to room temperature. Following this, the solvent may be removed by distillation on a steambath or any other similar apparatus, after which the excess hydrazine compound is also removed, usually by washing with water or by fractional distillation under reduced pressure. In this respect, it should be noted that the hydrazine or substituted hydrazine compounds are present in the original reaction mixture in equimolar quantities although an excess over the halo substituted polyhydroalkanonaphthalenedicarboxylic acid may also be used in some cases. The desired reaction product is removed from the distillation and purified by conventional means such as washing, dissolving in an organic solvent, drying and crystallization.

It is also contemplated within the scope of this invention that the hydrazides of halo substituted polyhydroalkanonaphthalenedicarboxylic acids may be prepared in a continuous manner of operation, although not necessarily with equivalent results. When such a method is used, a quantity of the starting materials comprising the halo substituted polyhydroalkanonaphthalenedicarboxylic acid and the excess of the hydrazine compound are continuously charged to a reaction vessel which is maintained at the proper operating conditions of temperature and pressure. Inasmuch as the reaction, as prevously stated, is exothermic in nature, the starting materials are charged through the reactor through separate lines. The substantially inert organic solvent is also continuously charged to the reactor and is utilized for the purpose of azeotroping off the water of the reaction which is formed. Upon completion of the desired residence time, the reactor effluent is continuously removed, the unreacted starting materials are separated from the effluent and recycled to form a portion of the feedstock, while the reactor and the effluent is subjected to fractional distillation to remove the solvent and thereafter purified and recovered by conventional means.

It is also contemplated within the scope of this invention that the desired products of the present invention comprising hydrazides of halo substituted polyhydromethanonaphthalenedicarboxylic acids may be prepared by reacting a halo substituted polyhydromethanonaphthalenedicarboxylic anhydride with a hydrazine in the presence of a strong inorganic acid in an aqueous medium. Examples of strong inorganic acids include concentrated hydrochloric acid, concentrated sulphuric acid, etc. The resulting reaction is highly exothermic in nature and therefore steps must be taken to control the temperature of the reaction during the residence time, the reaction being effected at temperatures ranging from about room temperature (25°) up to about 100° C. When forming the desired product according to this method, it will be noted that symetric and asymetric amino imides of the acid are also formed as by products and thus an additional step of separation is required in order to obtain the desired product comprising, as hereinbefore set forth, a hydrazide of a halo substituted polyhydromethanonaphthalenedicarboxylic acid.

The novel compositions of matter of this invention are halosubstituted polyhydroalkanonaphthalenedicarboxyhydrazides characterized by the general structural formula:

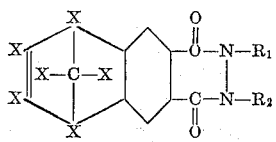

in which X is chlorine, bromine or hydrogen, at least one X being chlorine or bromine, and $R_1$ and $R_2$ are independently selected from the group consisting of hydrogen, lower alkyl, cycloalkyl containing 5 to 7 carbon atoms, monocyclic or bicyclic carbocyclic aryl, lower alkyl-substituted aryl the aromatic nucleus of which is carbocyclic and monocyclic or bicyclic, and aryl-substituted lower alkyl, the aromatic nucleus of the aryl substituent being carbocyclic and monocyclic or bicyclic.

Examples of novel compositions of matter comprising the invention of the present application which are prepared according to the process hereinbefore set forth include 5,6,7,8-tetrachloro-1,2,3,4,4a,5,8,8a-octahydro-5,8-methano-2,3-naphthalenedicarboxy-$N^1,N^2$-hydrazide, 5,6,7,8-tetrachloro-1,2,3,4,4a,5,8,8a-octahydro-5,8-methano-2,3-naphthalenedicarboxy-$N^1$-methyl-$N^1,N^2$-hydrazide, 5,6,7,8-tetrachloro-1,2,3,4,4a,5,8,8a-octahydro-5,8-methano-2,3-naphthalenedicarboxy-$N^1,N^2$dimethyl-$N^1,N^2$-hydrazide, 5,6,7,8-tetrachloro-1,2,3,4,4a,5,8,8a-octahydro-5,8-methano-2,3-naphthalenedicarboxy-$N^1$-ethyl-$N^1,N^2$-hydrazide, 5,6,7,8-tetrachloro-1,2,3,4,4a,5,8,8a-octahydro-5,8-methano-2,3-naphthalenedicarboxy-$N^1,N^2$-diethyl-$N^1,N^2$-hydrazide, 5,6,7,8-tetrachloro-1,2,3,4,4a,5,8,8a-octahydro-5,8-methano-2,3-naphthalenedicarboxy-$N^1$-phenyl-$N^1,N^2$-hydrazide, 5,6,7,8,9,9-hexachloro-1,2,3,4,4a,5-8,8a-octahydro-5,8-methano-2,3-naphthalenedicarboxy-$N^1,N^2$-hydrazide, 5,6,7,8,9,9-hexachloro-1,2,3,4,4a,5,8,8a-octahydro-5,8-methano-2,3-naphthalenedicarboxy-$N^1$-methyl-$N^1,N^2$-hydrazide, 5,6,7,8,9,9-hexachloro-1,2,3,4,4a,5,8,8a-octahydro-5,8-methano-2,3-naphthalenedicarboxy-$N^1,N^2$-dimethyl-$N^1,N^2$-hydrazide, 5,6,7,8,9,9-hexachloro-1,2,3,4,4a,5,8,8a-octahydro-5,8-methano-2,3-naphthalenedicarboxy-$N^1$-ethyl-$N^1,N^2$-hydrazide, 5,6,7,8,9,9-hexachloro-1,2,3,4,4a,5,8,8a-octahydro-5,8-methano-2,3-naphthalenedicarboxy-$N^1,N^2$-diethyl-$N^1,N^2$-hydrazide, 5,6,7,8,9,9-hexachloro-1,2,3,4,4a,5,8,8a-octahydro-5,8-methano-2,3-naphthalenedicarboxy-$N^1$-phenyl-$N^1,N^2$-hydrazide, 5,6,7,8-tetrabromo-1,2,3,4,4a,5,8,8a-octahydro-5,8-methano-2,3-naphthalenedicarboxy-$N^1,N^2$-hydrazide, 5,6,7,8-tetrabromo-1,2,3,4,4a,5,8,8a-octahydro-5,8-methano-2,3-naphthalenedicarboxy-$N^1$-methyl-$N^1,N^2$-hydrazide, 5,6,7,8-tetrabromo-1,2,3,4,4a,5,8,8a-octahydro-5,8-methano-2,3-naphthalenedicarboxy-$N^1,N^2$-dimethyl-$N^1,N^2$-hydrazide, 5,6,7,8-tetrabromo-1,2,3,4,4a,5,8,8a-octahydro-5,8-methano-2,3-naphthalenedicarboxy-$N^1$-ethyl-$N^1,N^2$-hydrazide, 5,6,7,8-tetrabromo-1,2,3,4,4a,5,8,8a-octahydro-5,8-methano-2,3-naphthalenedicarboxy-$N^1,N^2$-diethyl-$N^1,N^2$-hydrazide, 5,6,7,8-tetrabromo-1,2,3,4,4a,5,8,8a-octahydro-5,8-methano-2,3-naphthalenedicarboxy-$N^1$-phenyl-$N^1,N^2$-hydrazide, 5,6,7,8,9,9-hexabromo-1,2,3,4,4a,5,8,8a-octahydro-5,8-methano-2,3-naphthalenedicarboxy-$N^1,N^2$-hydrazide, 5,6,7,8,9,9-hexabromo-1,2,3,4,4a,5,8,8a-octahydro-5,8-methano-2,3-naphthalenedicarboxy-$N^1$-methyl-$N^1,N^2$-hydrazide, 5,6,7,8,9,9-hexabromo-1,2,3,4,4a,5,8,8a-octahydro-5,8-methano-2,3-naphthalenedicarboxy-$N^1,N^2$-dimethyl-$N^1,N^2$-hydrazide, 5,6,7,8,9,9-hexabromo-1,2,3,4,4a,5,8,8a-octahydro-5,8-methano-2,3-naphthalenedicarboxy-$N^1$-ethyl-$N^1,N^2$-hydrazide, 5,6,7,8,9,9-hexabromo-1,2,3,4,4a,5,8,8a-octahydro-5,8-methano-2,3-naphthalenedicarboxy-$N^1,N^2$-diethyl,$N^1,N^2$-hydrazide, 5,6,7,8,9,9-hexabromo-1,2,3,4,4a,5,8,8a-octahydro-5,8-methano-2,3-naphthalenedicarboxy-$N^1$-phenyl-$N^1,N^2$-hydrazide.

It is to be understood that the aforementioned compounds are only representative of the class of compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example, 32 g. (1.0 mole) of hydrazine is placed in a reaction vessel. Then 600 g. of water and 200 g. of concentrated hydrochloric acid are added while mixing vigorously and cooling. During a period of about 1 hour, 424 g. (110 mole) of 5,6,7,8,9,9-hexachloro-1,2,3,4,4a,5,8,8a - octahydro - 5,8 - methano - 2,2 - naphthalenedicarboxylic anhydride is gradually added thereto. The reaction mixture is then refluxed for two hours while mixing vigorously. The product is then precipitated by cooling or chilling and dissolved in alcohol, following which the solution is dried using anhydrous sodium sulfate. The mixture is then filtered and the alcohol evaporated thereby leaving the desired product which comprises 5,6,7,8,9,9-hexachloro - 1,2,3,4,4a,5,8,8a - octahydro - 5,8 - methano-2,3-naphthalenedicarboxy-$N^1,N^2$-hydrazide.

EXAMPLE II

In this example 22.5 (0.5 mole) of methylhydrazine is charged to a reaction flask provided with an agitator. The flask is immersed in an icebath until the temperature of the methylhydrazine is lowered to about 3° C. Following this 300 g. of water and 100 g. of concentrated hydrochloric acid are added while cooling. Following this, 5,6,7,8,9,9 - hexachloro - 1,2,3,4,4a,5,8,8a - octahydro-5,8-methano - 2,3 - naphthalenedicarboxylic acid is added slowly during a period of about 30 minutes. The immediate reaction upon the addition of the anhydride will be exothermic and the well temperature will reach about 15° C. during the addition. The reaction mixture is then refluxed at a temperature of about 105° C. for a period of about 1 hour. Following this the solution is allowed to cool to room temperature and treated in a manner similar to that set forth in Example I above. The desired product comprising 5,6,7,8,9,9 - hexachloro - 1,2,3,4,4a,5,8,8a-octahydro - 5,8 - methano - 2,3 - naphthalenedicarboxy-$N^1,N^2$-methyl-$N^1,N^2$-hydrazide is recovered.

EXAMPLE III

In this example 30 g. (0.5 mole) of ethylhydrazine along with 300 cc. of water and 100 cc. of concentrated hydrochloric acid are placed in a reaction flask provided with heating, stirring, and reflux means. To this solution is added 221 g. (0.5 mole) of 5,6,7,8,9,9-hexachloro-1,2,3,4,4a5,8,8a - octahydro - 5,8 - methano - 2,3 - naphthalenedicarboxylic acid, following which the mixture is then heated to reflux, and maintained thereat for a period of about 4 hours. The flask and contents thereof are then allowed to cool to room temperature, the reaction mixture is then treated in a manner similar to that set forth in Example I above and the desired product comprising 5,6,7,8,9,9 - hexachloro - 1,2,3,4,4a,5,8,8a - octahydro - 5,8-methano - 2,3 - naphthalenecarboxy - $N^1$ - ethyl - $N^1,N^2$-hydrazide is recovered.

EXAMPLE IV

The reaction vessel is immersed in an icebath and 55.3 g. (0.5 mole) of phenylhydrazine is added thereto. When the temperature of the flask and contents thereof reaches about 3° C., 221 g. (0.5 mole) of 5,6,7,8,9,9-hexachloro-1,2,3,4,4a,5,8,8a - octahydro - 5,8 - methano - 2,3 - naphthalenedicarboxylic acid is slowly added thereto during a period of about 30 minutes. At the end of this time the flask and contents thereof are allowed to warm to room temperature and 200 cc. of toluene is added thereto. The flask and contents thereof are heated to a temperature of 115° C., mixed vigorously and maintained thereat for a period of about 4 hours, the reaction being completed when the theoretical amount of water which is formed during the reaction is recovered in the water-trap. At the end of this time the flask and contents thereof are allowed to cool to room temperature, the solvent and excess phenylhydrazine being removed by distillation. The desired product comprising 5,6,7,8,9,9 - hexachloro - 1,2,3,4, 4a,5,8,8a - octahydro - 5,8 - methano - 2,3 - naphthalenedicarboxy - $N^1$ - phenyl - $N^1,N^2$ - hydrazide is recovered by conventional means.

EXAMPLE V

In this example 30 g. (0.5 mole) of dimethylhydrazine along with 200 cc. of toluene is placed in a reaction flask which is thereafter cooled by means of an icebath. Following this 221 g. (0.5 mole) of 5,6,7,8,9,9 - hexachloro-1,2,3,4,4a,5,8,8a - octahydro - 5,8 - methano - 2,3 - naphthalenedicarboxylic acid is slowly added thereto during a period of about 30 minutes. Upon completion of the addition which is accompanied by a rise in temperatures due to the exothermic nature of the reaction, the flask and contents thereof are heated to the reflux temperature of about 115° C. and maintained thereat for a perior of about 4 hours. The theoretical amount of water which is formed during the reaction is collected in the water-trap. Upon completion of the reaction, the flask and contents thereof are allowed to cool to room temperature, following which the toluene and the excess dimethylhydrazine are removed by distillation. The desired product comprising 5,6,7,8,9,9 - hexachloro - 1,2,3,4,4a,5,8,8a - octahydro-5,8 - methano - 2,3 - naphthalenedicarboxylic acid - $N^1,N^2$-dimethyl - $N^1,N^2$ - hydrazide is recovered by conventional means.

I claim as my invention:

1. 5,6,7,8,9,9 - hexachloro - 1,2,3,4,4a,5,8,8a - octahydro - 5,8 - methano - 2,3, - naphthalenedicarboxy - $N^1,N^2$-hydrazide.
2. 5,6,7,8,9,9 - hexachloro - 1,2,3,4,4a,5,8,8a - octahydro - 5,8 - methano - 2,3 - naphthalenedicarboxy - $N^1$-methyl-$N^1,N^2$-hydrazide.
3. 5,6,7,8,9,9 - hexachloro - 1,2,3,4,4a,5,8,8a - octahydro - 5,8 - methano - 2,3 - naphthalenedicarboxy - $N^1$-ethyl-$N^1,N^2$-hydrazide.
4. 5,6,7,8,9,9 - hexachloro - 1,2,3,4,4a,5,8,8a - octahydro - 5,8 - methano - 2,3 - naphthalenedicarboxy - $N^1$-phenyl-$N^1,N^2$-hydrazide.
5. 5,6,7,8,9,9 - hexachloro - 1,2,3,4,4a,5,8,8a - octahydro - 5,8 - methano - 2,3 - naphthalenedicarboxy - $N^1,N^2$-dimethyl-$N^1,N^2$-hydrazide.
6. Halosubstituted polyhydromethano - naphthalenedicarboxyhydrazide having the formula

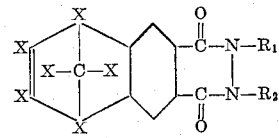

in which X is chlorine, bromine or hydrogen, at least one X being chlorine or bromine, and $R_1$ and $R_2$ are independently selected from the group consisting of hydrogen, lower alkyl, cycloalkyl containing 5 to 7 carbon atoms, monocyclic or bicyclic carbocyclic aryl, lower alkyl-substituted aryl the aromatic nucleus of which is carbocyclic as well as monocyli or biylic, and aryl-substituted lower alkyl, the aromatic nucleus of the aryl substituent being carbocyclic as well as monocyclic or bicyclic.

7. The compound of claim 6 further characterized in that each X is chlorine.

References Cited

UNITED STATES PATENTS 3,017,431  1/1962  Schmerling.

NICHOLAS S. RIZZO, *Primary Examiner.*